J. MOYLE.
Straw Cutter.
No. 9,991.
Patented Sept. 6, 1853.
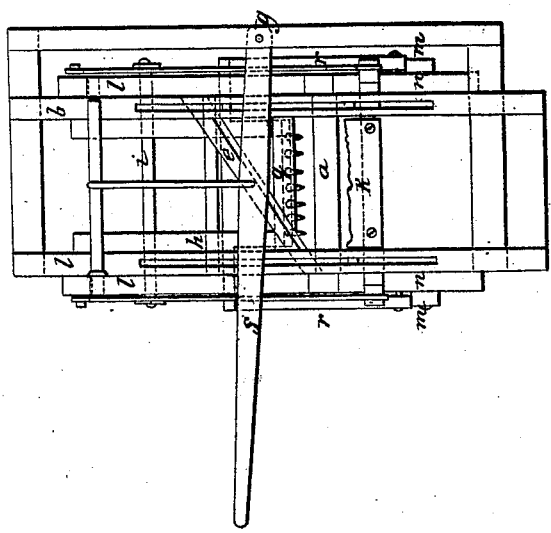
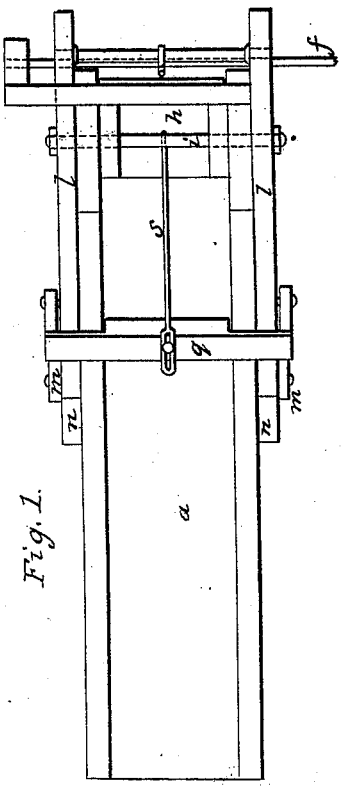
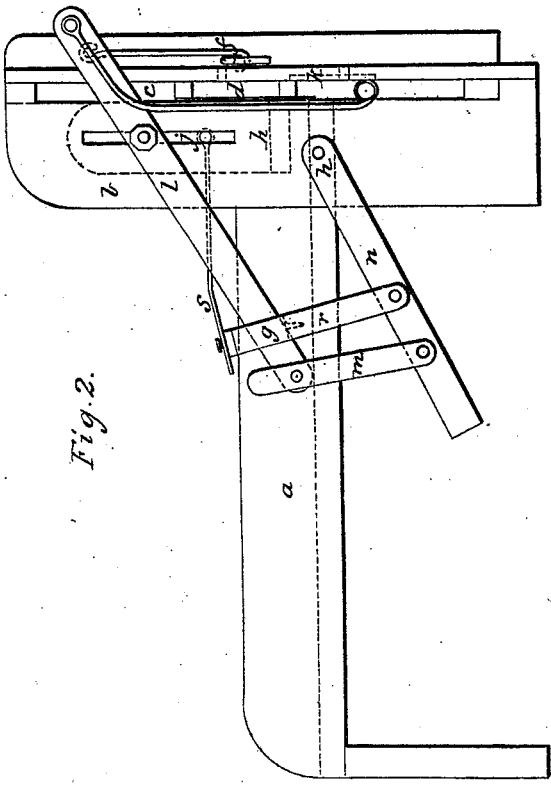

UNITED STATES PATENT OFFICE.

JOHN MOYLE, OF MARTINSBURG, VIRGINIA.

STRAW-CUTTER.

Specification of Letters Patent No. 9,991, dated September 6, 1853.

*To all whom it may concern:*

Be it known that I, JOHN MOYLE, of Martinsburg, in the county of Berkeley and State of Virginia, have invented a new and useful Improvement in Straw-Cutters; and I do hereby declare that the following is a full, clear, and exact description of the construction and operation of the same, reference being had to the annexed drawings, forming part of this specification, in which—

Figure 1 is a plan of the straw cutter. Fig. 2 is a side elevation of the same. Fig. 3 is an end elevation.

Similar letters in the several figures refer to the same part of the machine.

My invention consists in combining with an oblique cutter operated by a lever a feeding and holding arrangement actuated by the cutting lever through a combination of levers and connecting rods, so as to move forward the straw when the knife is elevated and bind it firmly to the box during the cutting of the feed.

In the drawings $a$ is the box having at the fore end the upright frame $b$, in the slots $c, c$ of which is movable the frame $d$, carrying the knife $e$, which is operated by the lever $f$, having its fulcrum at $g$. Between the uprights $b$ is the holder $h$, having the rod $i$ passing through its sides and connecting it with the levers $l$, which have their fulcra in this bar $i$. Connected with the levers $l$ by the rods $m$, are the levers $n$ having their fulcra at $p$. Within the box $a$ is the rake $q$, having arms $r$ passing over the levers $l$, and attached to and movable upon the lever $n$. It is also connected with the holder $h$, by the rod $s$.

The operation of my improved straw cutter is as follows:—The elevation of the lever $f$, raises the levers $l$, and with them the holder $h$, the bar $i$ moving in the slot $j$ to accommodate this motion. The knife frame $d$ also rises, carrying with it the plate $k$, which, resting in front of the box, limits the protrusion of the straw. Simultaneous with the movements in the forward portion of the machine the connecting rods $m$ are drawn forward by the upward motion of the levers $l$, and striking the arms $r$ of the rake $q$, press forward the rake, so as to move the straw a sufficient distance for the feed. The straw passes under the holder $h$, and advances until its ends strike the plate $k$, which is capable of adjustment to the length of cut required. The lever $f$ is then depressed, carrying with it the knife frame $d$, holder $h$, and bar $i$. When the holder ceases the vertical movement the levers $l$ then move on the bar $i$, and the knife $e$ passing across the box performs the cut. During the operation of cutting the straw is prevented from slipping by the compression of the holder, which acts with a force due to the weight of the machinery sustained by the long arms of the levers $l$, and the power applied to the short arms of the same levers, After the completion of the cut the lever $f$ is again raised, with the effect above described, and cuts and otherwise performs as above stated by its return movement. In this manner the operation continues, the lever $f$ being alternately elevated and depressed, causing by its action the machine to feed, bind and cut in a rapid and effectual manner.

What I claim as my invention and desire to secure by Letters Patent, is—

The combination of the rake $q$ and holder $h$, constructed and operating substantially as described, for feeding the straw to be cut, and binding it to the box, as herein specified.

In testimony whereof, I have hereunto signed my name before two subscribing witnesses.

JOHN MOYLE.

Witnesses:
GEO. PATTEN,
JNO. OBER.